United States Patent [19]

Hightower, Jr. et al.

[11] Patent Number: 4,764,319
[45] Date of Patent: Aug. 16, 1988

[54] HIGH SOLIDS RATIO SOLID ROCKET MOTOR PROPELLANT GRAINS AND METHOD OF CONSTRUCTION THEREOF

[75] Inventors: James O. Hightower, Jr.; Tomio Sato; James W. Hamner, all of Huntsville; Rector, Carl M., Brownsboro, all of Ala.

[73] Assignee: Morton Thiokol, Inc., Chicago, Ill.

[21] Appl. No.: 908,761

[22] Filed: Sep. 18, 1986

[51] Int. Cl.$^4$ ............................................. C06B 21/00
[52] U.S. Cl. ..................................... 264/3.4; 264/3.1; 102/289; 102/291
[58] Field of Search .................. 264/3.1, 3.3, 3.4, 3.5; 102/289, 291

[56] References Cited

U.S. PATENT DOCUMENTS

| | | | |
|---|---|---|---|
| 2,961,710 | 11/1960 | Stark | 18/48 |
| 2,977,885 | 4/1961 | Perry, Jr. et al. | 102/289 X |
| 3,109,374 | 11/1963 | Rumbel et al. | 102/98 |
| 3,109,375 | 11/1963 | Rumbel et al. | 102/98 |
| 3,125,542 | 3/1964 | Haines | 260/2.5 |
| 3,140,663 | 7/1964 | Rumbel et al. | 102/98 |
| 3,163,113 | 12/1964 | Davis et al. | 102/289 |
| 3,165,483 | 1/1965 | Gemeinhardt et al. | 260/2.5 |
| 3,171,820 | 3/1965 | Volz | 260/2.5 |
| 3,175,025 | 3/1965 | Geen et al. | 264/80 |
| 3,175,030 | 3/1965 | Geen | 264/321 |
| 3,191,535 | 6/1965 | Mulloy | 264/3 X |
| 3,230,281 | 1/1966 | Carrez | 102/289 X |
| 3,308,210 | 3/1967 | Ross | 102/289 X |
| 3,367,268 | 2/1968 | Spenadel et al. | 102/289 |
| 3,389,025 | 6/1968 | Nix et al. | 102/289 X |
| 3,390,210 | 6/1968 | Guenter | 264/3.3 |
| 3,499,283 | 3/1970 | Simpkins | 60/39.47 |
| 3,616,841 | 11/1971 | Walz | 264/44 X |
| 3,664,133 | 5/1972 | Iwanciow et al. | 102/102 X |
| 3,678,854 | 7/1972 | Davidson | 102/289 X |
| 3,711,115 | 1/1973 | Lohr | 102/39.5 X |
| 3,756,025 | 9/1973 | McCullogh | 102/102 X |
| 3,764,420 | 10/1973 | Sayles | 102/289 X |
| 3,807,171 | 4/1974 | Anderson | 102/289 X |
| 3,811,380 | 5/1974 | Glass | 102/102 X |
| 3,822,645 | 7/1974 | Alexander | 102/98 |
| 3,827,715 | 8/1974 | Lynch | 102/39 X |
| 3,829,537 | 8/1974 | Rosenthal | 149/2 X |
| 3,860,678 | 1/1975 | Martin et al. | 149/14 X |

(List continued on next page.)

FOREIGN PATENT DOCUMENTS 45-20199 7/1970 Japan.

OTHER PUBLICATIONS

Brochure, "Duocel, a New Basic Design Material", by Energy Research and Generation, Inc.
Technical Report AFRPL-TR-68-232, Dec., 1968, "Foamed Aluminum Propellant Study."
Brochure, "Duocel Foam Metal, a New Basic Design Material for Energy Absorption and Structural Applications", by Energy Research and Generation, Inc.
Brochure, "Duocel Foam Metal, a New Basic Design Material, Passive Omnidirectional Borehole Deformation Gauge", by Energy Research and Generation, Inc.
Brochure, "ERG Evolutionary Basic Design Materials", by Energy Research and Generation, Inc.
Brochure, "Reticulated Vitreous Carbon", by Energy Research and Generation, Inc.
"Scott, Chemotronics Get Reticulation Patents", C&EN, Jun. 7, 1965, p. 42.

Primary Examiner—Peter A. Nelson
Attorney, Agent, or Firm—James C. Simmons; Gerald K. White

[57] ABSTRACT

A high acceleration high performance solid rocket motor grain such as for a ballistic defense missile or rocket assisted projectile comprises a propellant material which includes a highly plasticized binder so that the grain has a solids ratio equal to at least about 95 percent. In order that the grain with such a solids ratio may have adequate strength and withstand high acceleration forces, a reticulated structure is embedded therein. A method of constructing a rocket motor having such a grain is also disclosed.

11 Claims, 2 Drawing Sheets

U.S. PATENT DOCUMENTS

| | | | |
|---|---|---|---|
| 3,897,221 | 7/1975 | Salyer et al. | 264/44 |
| 3,925,122 | 12/1975 | Berthmann et al. | 264/3 R |
| 3,946,039 | 3/1976 | Walz | 264/44 X |
| 3,972,545 | 8/1976 | Kirchoff et al. | 102/37.7 X |
| 4,072,546 | 2/1978 | Winer | 149/100 X |
| 4,083,905 | 4/1978 | Insley et al. | 264/44 X |
| 4,085,173 | 4/1978 | Lomax, Jr. et al. | 102/289 X |
| 4,102,953 | 7/1978 | Johnson et al. | 264/3.3 |
| 4,116,466 | 9/1978 | Gehrig | 102/39 X |
| 4,321,220 | 3/1982 | Camp | 264/3 R X |
| 4,370,181 | 1/1983 | Lundstrom et al. | 149/2 |
| 4,393,014 | 7/1983 | Ziegler | 264/3.1 |
| 4,409,155 | 10/1983 | Bonnycastle et al. | 264/3.1 |
| 4,418,622 | 12/1983 | Foster et al. | 102/307 |
| 4,458,595 | 7/1984 | Gerrish, Jr. et al. | 264/3.1 X |
| 4,547,342 | 10/1985 | Adams et al. | 102/531 X |
| 4,660,475 | 4/1987 | Rogowski et al. | 264/3.2 X |

HIGH SOLIDS RATIO SOLID ROCKET MOTOR PROPELLANT GRAINS AND METHOD OF CONSTRUCTION THEREOF

The present invention relates to the construction of solid rocket motor propellant grains. More particularly, the present invention relates to the construction of such propellant grains with reticulated structures embedded therein.

It has been suggested in U.S. Pat. No. 3,191,535 to Mulloy to prepare a solid propellant which consists essentially of a cellular fuel element having uniform interconnecting spherical voids of a metal or metal alloy, and a propellant material filling the voids.

It has also been suggested in U.S. Pat. Nos. 3,616,841 and 3,946,039 to Walz that form retaining reticulated structures of metal or the like may be used as solid propellant reinforcement and burning rate modifiers. These Walz patents, which are hereby incorporated herein by reference and made a part of this specification, describe methods for producing such a reticulated structure by using as a pattern a self-supporting reticulated polyurethane or organic foam formed of ligaments to provide a wide range of pore sizes, varying from 3 to 125 pores per linear inch, and the finished foam material is characterized as having ligaments which are continuous, gas-free or of low porosity, and of integral construction. The Walz patents further disclose that the resulting foam structure may be trimmed or shaped or chemically or electrically etched, and that various modifications (unspecified), both chemical and physical, can be carried out with the reticulated foam. Such a structure is generally known to be machinable.

The Walz patents do not disclose or suggest, however, how to construct a centrally perforated propellant grain with a reticulated structure embedded therein. It is therefore an object of the present invention to provide a method of constructing a rocket motor with a reticulated structure embedded in a centrally perforated propellant grain thereof.

For solid rocket propellant grains without reticulated structures embedded therein, solids ratios of up to about 92 per cent have been achieved with the use of hydroxy terminated polybutadiene (HTPB) binders. By "solids ratio", as that term is used in this specification and the claims, is meant the ratio by weight of propellant grain materials which are solid at the processing temperature such as aluminum powder and other solid fuel particles, reticulated structures, ammonium perchlorate, and solid burn rate catalysts to the total weight of material in the propellant grain. The solids ratio is a measure of the energy available in the grain to produce thrust. Prior to being cast in a rocket motor case, the propellant material is formulated and mixed and then flowed into the case. As the solids ratio of mixed propellant material with low plasticizer content binders increases above 92 percent, it becomes too viscous for practical processing. Although a cast propellant material which has a solids ratio of 95 percent or higher may be provided if a highly plasticized binder is used, such a propellant material may not have sufficient binding material, i.e., polymer to provide sufficient strength. It is therefore another object of the present invention to provide a solid rocket motor propellant grain which has an increased solids ratio in the range of 95 percent or higher for increased performance yet also has sufficient strength for use.

Ballistic defense missiles, rocket assisted projectiles, and the like require high accelerations often in the order of 100 gs or greater in order to achieve their desired objectives. However, such high accelerations may not be withstood by the propellant grains unless they are adequately reinforced. It is yet another object of the present invention to provide such a propellant grain which can withstand such high acceleration forces.

It is still another object of the present invention to provide such a propellant grain which also has increased range.

For rockets which are spin stabilized, there is a tendency for centrifugal force to cause diffusion of solid fuel particles outwardly toward the case with resulting burn rate augmentation effects which it is desirable to avoid. Such effects have been reduced by incurring performance penalties such as reduced spin. It is thus another object of the present invention to provide a propellant grain wherein the resulting burn rate augmentation effects from high spin velocities are minimized but without incurring performance penalties.

The above and other objects, features, and advantages of this invention will be apparent in the following detailed description of the preferred embodiments thereof which is to be read in connection with the accompanying drawings.

DETAILED DESCRIPTION OF THE PREFERRED EMBODIMENTS

Figure 1:
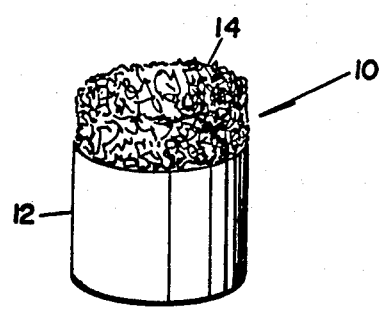
FIG. 1 is a perspective view of a propellant grain portion with a reticulated structure embedded therein but with a portion of the reticulated structure left unfilled with propellant mass to better illustrate the reticulated structure of the present invention.

Referring to FIG. 1, there is illustrated at 10 a solid propellant grain portion which includes an homogeneous mass 12 of propellant material including a suitable oxidant in which is embedded a reticulated structure 14 of combustible or non-combustible material such as, for example, but not limited to, aluminum, boron, magnesium, beryllium, copper, alumina, carbon, polyurethane, graphite, and zinc. If it is not necessary that the propellant be smokeless, it is usually preferred that the reticulated structure 14 be composed of combustible material such as, for example, but not limited to, aluminum, boron, beryllium, or copper so that it will also burn as the homogeneous mass of propellant burns to provide increased energy. However, if it is desired that the propellant be smokeless, it is preferred that the reticulated structure 14 be composed of carbon, graphite or a non-combustible material such as, for example, boron nitride, silicon carbide, alumina, or a high melting point metal such as titanium or a zirconium-titanium alloy. Although carbon and graphite are combustible under some conditions such as if the propellant mass is oxygen rich, they produce non-smoke producing carbon dioxide when they burn. For the purposes of this specification and the claims, the term "homogeneous mass of propellant material" refers to a propellant material of uniform structure or composition and is meant to include propellant mixtures commonly known as composite propellants as well as homogeneous propellant compounds commonly known as homogeneous propellants. A portion (the upper portion in FIG. 1) of the grain 10 has been left unfilled with propellant material in order to better illustrate the reticulated structure 14 which is an isotropic structure similar to the structures described in the Walz patents previously referred to. Such a structure is composed of a multitude of ligaments which are of generally uniform dimension and interconnected with each other to form voids which are open to each other so that they may be filled with propellant or other material. For the purposes of this specification and the claims, the term "reticulated structure" is meant to refer to a structure which is composed of a multitude of ligaments interconnected with each other to form voids which are open to each other and includes such a structure as described in the Walz patents.

Figure 2:
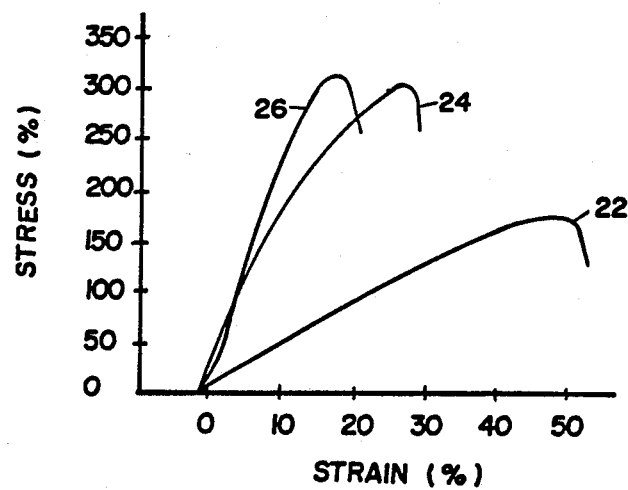
FIG. 2 is a stress-strain diagram for propellants reinforced with reticulated structures and one which is unreinforced.

FIG. 2 shows a stress-strain diagram for an unreinforced propellant at 22 and the propellant reinforced with 10 pores per linear inch and 20 pores per linear inch respectively reticulated aluminum similar to that described in the aforesaid patents to Walz at 24 and 26 respectively. The propellant in FIG. 2 is composed of the following by weight percent:

| Hydroxy terminated Polybutadiene (binder) | 9.990 |
| --- | --- |
| Catocene (burning rate catalyst) | 4.000 |
| Aluminum powder (fuel) | 18.000 |
| Ammonium perchlorate (oxidizer) | 68.000 |
| Triphenyl bismuth (cure catalyst) | 0.010 |

The reinforced grains 24 and 26 were composed of the aforementioned propellant with a portion of the aluminum powder replaced by reticulated aluminum so that the reinforced grains contained 13.491 percent aluminum powder and 4.509 percent reticulated aluminum. The tests resulting in the stress-strain diagram were conducted at a temperature of 77° F., a cross head speed of 2 inch/minute, and a specimen gage length of 1.25 inch. The ability of propellant grains to withstand high accelerations is related to the modulus of elasticity thereof, i.e., the greater the modulus of elasticity, the better a propellant grain is able to withstand high accelerations. As FIG. 2 indicates, the modulus of elasticity of a propellant grain as well as the stress which it can withstand may be increased greatly by embedding therein a reticulated structure. Such an increase in modulus of elasticity may be on the order of 4 times or more.

Figure 5:
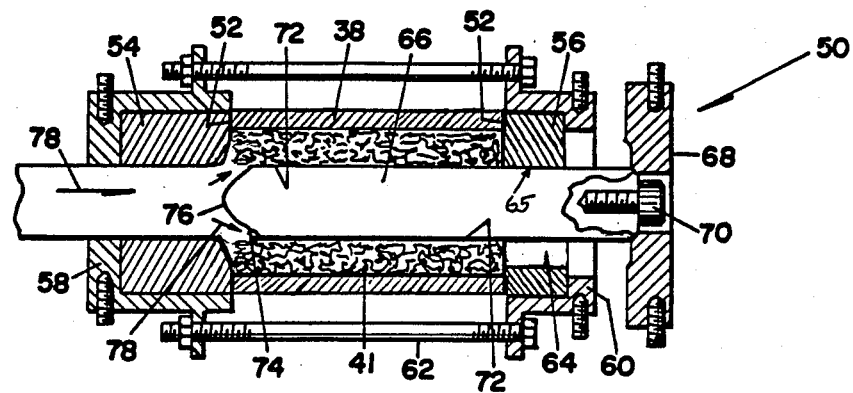
FIG. 5 is a section view of the case of FIG. 4 in which the reticulated structure of FIG. 4 and a core have been inserted so that the case may be filled with propellant material.
Figure 3:
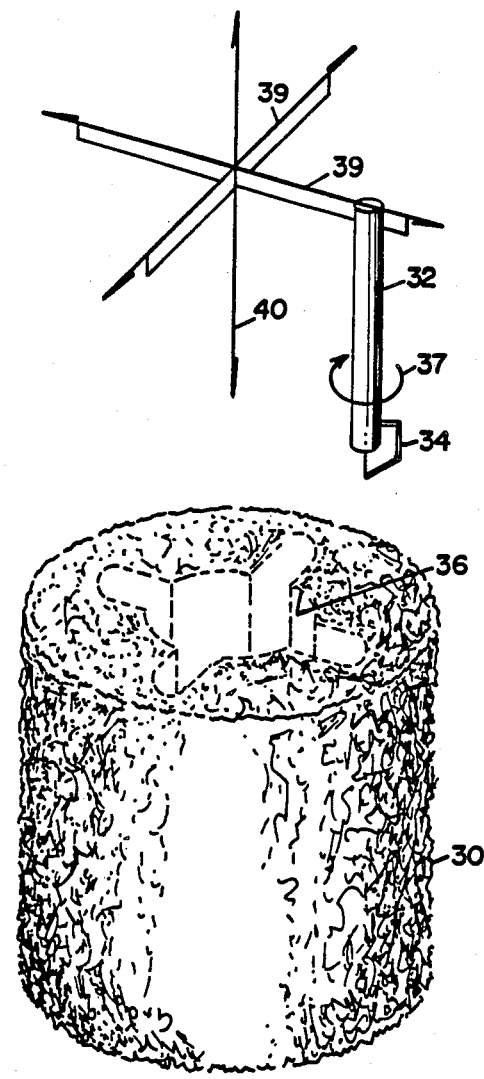
FIG. 3 is a schematic view illustrating the machining of a perforation axially through the center of a reticulated structure in accordance with the present invention.
Figure 4:
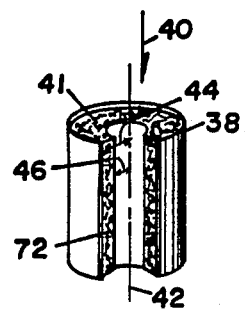
FIG. 4 is a perspective view illustrating a case with a reticulated structure, machined as illustrated in FIG. 3, inserted therein and with portions of the case and reticulated structure cut away.

Referring to FIGS. 3 to 5, there is illustrated a method of constructing a rocket motor section with a reticulated structure embedded in the propellant grain. In accordance with the method, the reticulated structure, similar to reticulated structure 14 in FIG. 1 and illustrated at 30 in FIG. 3, is machined to a predetermined shape. This includes machining such as by milling, as illustrated in FIG. 3, by use of a cutter member 32 having a blade 34 and rotating as illustrated at 37, a perforation, illustrated at 36, axially (i.e., in the direction 40) through the center of the structure 30. By "axially" is meant a direction, illustrated at 40 in FIGS. 3 and 4, parallel to the longitudinal axis 42 of a rocket motor when the structure 30 is properly positioned therein. In order to provide a predetermined propellant grain shape such as, for example, the illustrated type of star shape, the cutter member 32 is successively moved radially of the structure 30 (i.e., in the directions illustrated at 39 in FIG. 3) for successive cuts in the axial direction 40 thereof to form a series of parallel interconnecting perforations defining the desired grain shape.

Referring to FIG. 4, a tube shaped reticulated structure 41, machined in accordance with the method illustrated in FIG. 3, is then inserted in a motor case 38.

Referring to FIG. 5, the case 38, with the reticulated structure 41 contained therein is then positioned within a casting assembly illustrated generally at 50 for casting of propellant. The case 38 is sealingly engaged by means of rubber gaskets 52 or other suitable gaskets at both ends between alignment rings 54 and 56 composed of or coated with a synthetic resin polymer sold under the trademark Teflon. These alignment rings are clampingly held to the case 38 and reticulated structure 41 by respective housing members 58 and 60 and a pair of threaded bolts 62 extending between the housing members 58 and 60. Alignment ring 56 has a radially inner star-shaped portion, as illustrated at 64, having perhaps eight tips 65 spaced circumferentially thereof and extending radially inwardly to engage and center the core 66, which is shaped to conform to the shape of the internal perforation 72 of reticulated structure 41, and to permit excess propellant to escape between the tips during casting. A core puller 68 is attached by means of threaded screw 70 to one end of the core 66. In order to cast the propellant in the case 38, the core 66 is partially inserted within perforation 72 of the reticulated structure 41 over substantially the entire length of the reticulated structure 41 but leaving an opening 74 at the forward tapered end 76 between the reticulated structure 41 and the core 66. The propellant is then cast under pressure in the direction illustrated by arrows 78 through the opening 74 to fill the case 38 including voids in the reticulated structure 41, care being taken to prevent air pockets (voids) from forming during the filling process. Then the core 66 is further inserted until the core puller 68 is seated against the housing member 60 and the opening 74 is closed, and the propellant is allowed to cure at a suitable temperature of typically 145 degrees F. The core puller 68 is then used to remove the core 66 while the casting assembly 50 is restrained by an hydraulic clamp (not shown) after which the casting assembly 50 is disassembled to remove the rocket motor section.

In accordance with an alternative embodiment of this invention, the case may if desired be first filled with propellant and then the reticulated structure and core inserted into the propellant filled case.

The core 66 is preferably composed of a non-spark inducing and low localized heat generating material such as a synthetic resin polymer sold under the trademark Teflon, polyethylene, polystyrene, or a high melting point wax to prevent sparking or high localized heat generation as the core 66 is removed. By "low localized heat generating material" is meant a material which does not generate sufficient localized heat upon normal frictional contact with the reticulated structure to ignite the propellant.

If it is desired that the reticulated structure 41 and core 66 each be constructed of a metal or other material wherein sparks may be induced, the core 66 should be maintained over its length in a spaced relation from the reticulated structure 41, for example, by means of suitably sizing the core and reticulated structure, to prevent spark inducing contact between the core and the propellant impregnated reticulated structure as the core is removed therefrom. If the core 66 is composed of a metal, it is preferably coated with a wax or a synthetic polymer sold under the trademark Teflon to facilitate its removal easily from the propellant grain after it has been cast.

It is desirable to utilize propellant grains of high solids ratio, i.e., ratios in the range of 95 percent and greater, for high performance applications due to their increased energy content. However, a propellant composition which contains a low plasticizer content binder, i.e., a binder having less than about 20 percent plasticizer, may become too viscous for practical processing as the solids ratio increases above about 92 percent.

A binder usually contains a polymer, a curing agent, and a liquid plasticizer, except that thermoplastic and thermosetting binders do not contain curing agents. A typical low plasticizer content binder may contain, by weight, about 10 to 20 percent liquid plasticizer such as, for example, dioctyl adipate, dioctyl sebacate, dioctyl phthalate, or non-functional polybutadiene, about 7% curing agent such as di-isocyanate, and about 73 to 83% polymer such as HTPB (hydroxy terminated polybutadiene). Another example of a low plasticizer content binder may contain, by weight, about 10 to 20 percent liquid plasticizer such as those named above and about 80 to 90 percent thermoplastic elastomer polymer such as, for example, a co-polymer of polystyrene and butadiene, a multi-block polyurethane, a polyolefin blend, polyamide, or a polypropylene-EPDM blend. A liquid plasticizer is defined, for the purpose of this specification and the claims, as a material that has a viscosity less than 200 centipoise and whose chemical formula does not have reactive sites.

In order to provide a solid rocket motor propellant grain which is not too viscous for practical processing and which has an increased solids ratio in the range of 95 percent or higher in accordance with the present invention, the propellant material therefor is composed of a highly plasticized binder. For the purposes of this specification and the claims, a "highly plasticized binder" is defined as a binder which has a liquid plasticizer content equal to at least about 50 percent, by weight, of the binder. The plasticizer content is preferably less than about 30 percent, by weight, of the binder. However, such a propellant material may not contain sufficient binding material, i.e., polymer, to provide sufficient strength and also the ability to withstand high acceleration loads. Therefore, further in accordance with the present invention, a reticulated structure 41 is embedded in the highly plasticized propellant material to add sufficient increased strength as illustrated in FIG. 2 to the resulting grain and also to provide the ability to withstand acceleration loads in the range of 100 gs, i.e., 100 times the force of gravity or more. In addition, the reticulated structure 41 may be preferably composed of oxidizable material in order to further increase the solids ratio by perhaps 0.5 percent.

An example of a propellant grain embodying the present invention is as follows wherein the percentages are by weight:

| | |
|---|---|
| Aluminum (in reticulated structure) | 8.2% |
| Aluminum powder | 13.8% |
| Ammonium perchlorate | 72.0% |
| Iron oxide | 1.0% |
| Triphenyl bismuth | 0.01% |
| Binder (highly plasticized) | |
| dioctyl adipate liquid plasticizer | 2.5% |
| di-isocyanate curing agent | 0.3% |
| HTPB polymer | 2.19% |

Such a propellant grain has 95.01 percent solids for increased performance yet is sufficiently fluid, before casting, for processing, and the reticulated structure is provided so that the grain may have adequate strength and withstand high acceleration loads.

It may also be desirable to provide such a propellant grain which also has a high web fraction, i.e., a web fraction greater than 0.7, in order to provide higher loading density for increased range to a rocket. By "web fraction", for the purposes of this specification and the claims, is meant the difference between the outside radius 44 and bore radius 46 of a grain divided by the outside radius 44 thereof. However, for such high web fraction grains, there is an increased probability of cure and thermal shrinkage leading to propellant cracking and/or propellant-liner-insulation failure. Therefore, not only may a grain reinforced with a reticulated structure 30 be provided with a high solids ratio for high performance and acceleration as previously described but such a grain may also be with a high web fraction for increased range with the reticulated structure 41 used to also minimize such shrinkage. Thus, a reticulated structure reinforced grain in accordance with the present invention may be provided for both increased acceleration and increased range.

It is to be understood that the invention is by no means limited to the specific embodiments which have been illustrated and described herein, and that various modifications thereof may indeed be made which come within the scope of the present invention as defined by the appended claims.

What is claimed is:

1. A method of constructing a rocket motor with the propellant grain thereof including a reticulated structure embedded therein comprises the steps of:
   a. forming a reticulated structure to have a predetermined propellant grain shape;
   b. inserting the formed reticulated structure in a motor case;
   c. preparing a propellant material which includes a highly plasticized binder such that the grain has a solids ratio equal to at least about 95 percent;
   d. at least partially filling the case including voids in the reticulated structure with the propellant material; and
   e. casting the propellant material in the case.

2. A method according to claim 1 wherein the step of forming the reticulated structure includes machining a perforation axially through the center thereof, and the method further comprises providing a core which has a shape which conforms to the shape of the perforation and inserting the core in the perforation prior to filling the case with propellant material, and removing the core after casting of the propellant material.

3. A method according to claim 2 wherein the reticulated structure and core are each composed of a metal, the method further comprises spacing the core from the reticulated structure to prevent spark inducing and high localized heat generating metal to metal contact as the core is removed.

4. A method according to claim 2 further comprises selecting the core to be composed of a non-metallic low localized heat generating material.

5. A method according to claim 2 wherein step b further comprises inserting the case with the reticulated structure contained therein within a casting assembly, sealingly engaging the case at both ends thereof, partially inserting the core in the perforation such than an opening is left at one end through which is flowed the propellant material, centering the core, flowing the propellant material through the opening to fill the case with propellant material, and further inserting the core until the opening is closed after the case has been filed with propellant material to allow casting of the propellant material.

6. A method according to claim 5 further comprises selecting the core to be composed of a non-metallic low localized heat generating material.

7. A method according to claim 1 further comprises selecting the reticulated structure to be composed of a combustible material.

8. A method according to claim 7 further comprises sizing the grain to have a web fraction greater than 0.7.

9. A method according to claim 1 further comprises sizing the grain to have a web fraction greater than 0.7.

10. A method according to claim 1 further comprises selecting the binder to have a liquid plasticizer selected from the group consisting of dioctyl adipate, dioctyl sebacate, dioctyl phthalate, and non-functional polybutadiene.

11. A method according to claim 10 further comprises selecting the binder to have a HTPB polymer and a di-isocyanate curing agent.

* * * * *